No. 827,382. PATENTED JULY 31, 1906.
T. S. MILLER.
FRICTION CLUTCH MECHANISM.
APPLICATION FILED MAY 14, 1903.
2 SHEETS—SHEET 1.
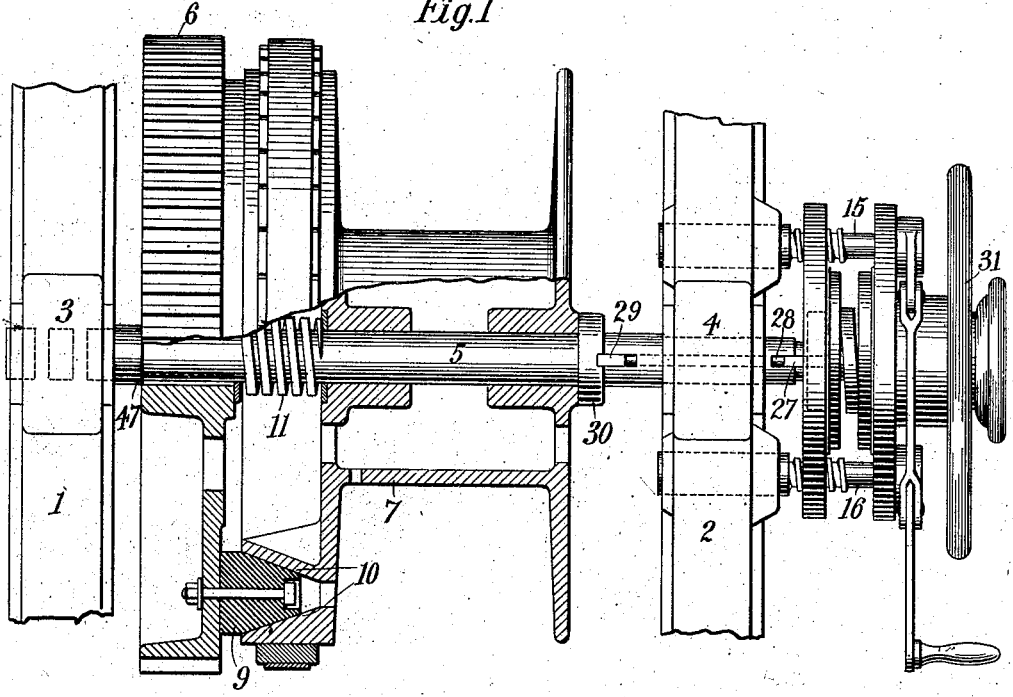
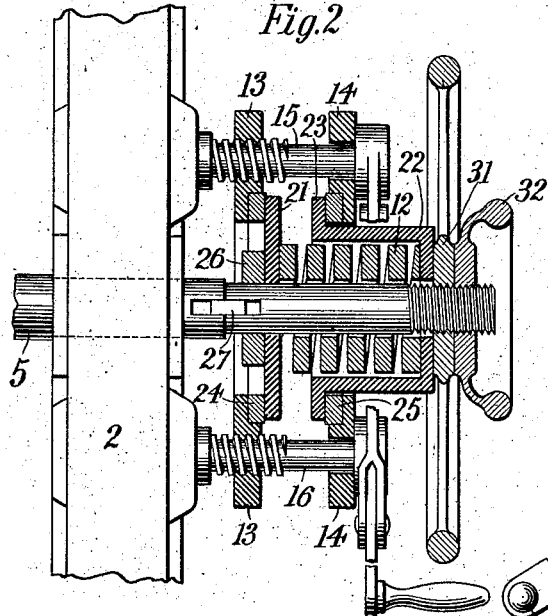
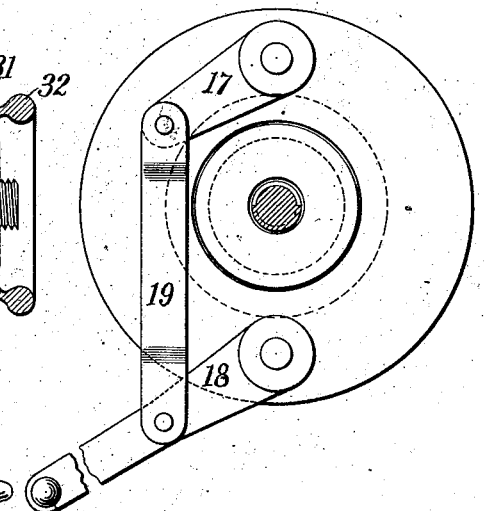
Witnesses: Inventor
Thomas Spencer Miller
by Gifford & Bull Att'ys No. 827,382. PATENTED JULY 31, 1906.
T. S. MILLER.
FRICTION CLUTCH MECHANISM.
APPLICATION FILED MAY 14, 1903.
2 SHEETS—SHEET 2.
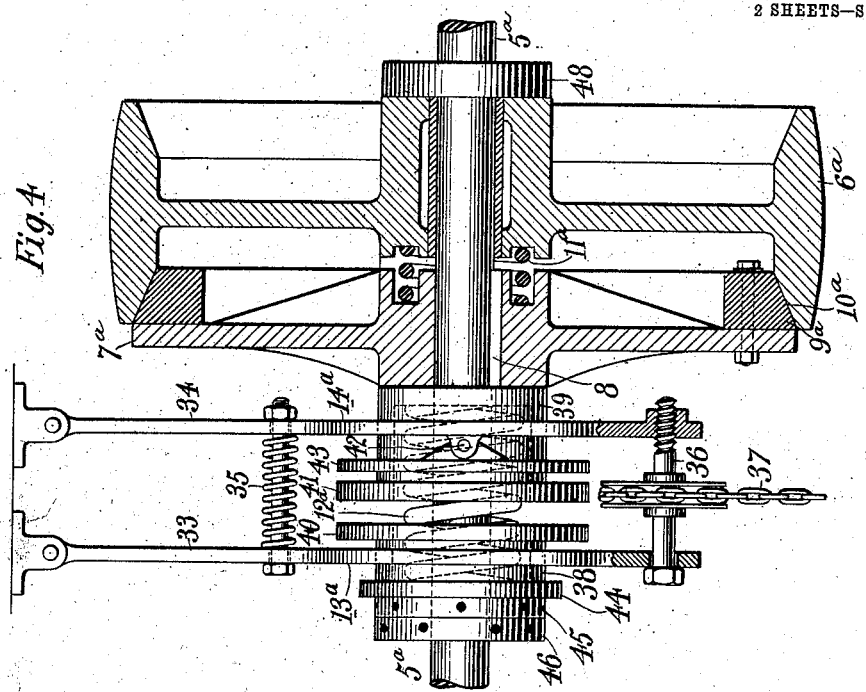
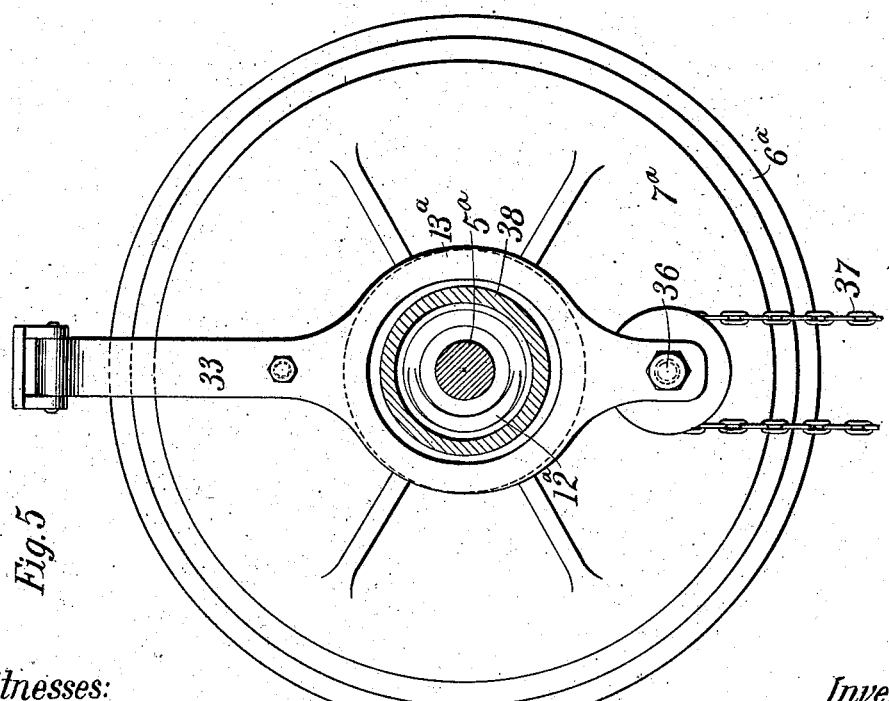
Witnesses: Inventor
Thomas Spencer Miller
by Gifford & Bull Attys

UNITED STATES PATENT OFFICE.

THOMAS SPENCER MILLER, OF SOUTH ORANGE, NEW JERSEY.

FRICTION CLUTCH MECHANISM.

No. 827,382.        Specification of Letters Patent.        Patented July 31, 1906.

Application filed May 14, 1903. Serial No. 157,107.

*To all whom it may concern:*

Be it known that I, THOMAS SPENCER MILLER, a citizen of the United States, and a resident of South Orange, Essex county, New Jersey, have invented a new and useful Improvement in Friction Clutch Mechanism, of which the following is a specification.

Figure 1 is a plan view, partly in section, of a friction rope-drum containing my invention. Figs. 2 and 3 are details of the same. Fig. 4 is a side view, partly in section, of my invention applied to a friction-pulley; and Fig. 5 is an end view of the same.

1 and 2 are stationary end frames carrying at 3 and 4 the bushings in which the shaft 5 is journaled.

6 is the prime mover of the mechanism shown, which in Fig. 1 is a spur-wheel driven from any suitable source of power and fixed upon the shaft 5, and in Fig. 4, 6$^a$ is a pulley revolubly mounted upon the shaft 5$^a$.

7 is the driven member of the clutch mechanism, which in Fig. 1 is the rope-drum revolubly mounted upon the shaft, and in Fig. 4, 7$^a$ is the disk revolubly fixed to the shaft by the spline 8.

9 is the friction-ring, which in Fig. 1 is secured to the face of the driving member. In Fig. 4, 9$^a$ is the friction-ring secured to the face of the driven member and which consists, preferably, of sections of wood. 10 is the flange on the opposite member, coöperating with the friction-ring, as shown in Fig. 1, and such coöperating flange is designated by 10$^a$ in Fig. 4.

11 is the coil-spring interposed between the two members and tending to force the friction-surfaces apart. 12 is a more powerful spring, which when unrestrained overcomes the spring 11 and forces the friction-surfaces together.

Spring-restraining mechanism is provided by the action of which upon the spring 12 the balance of power as between the spring 12 and its counter-spring 11 is so controlled as to set or unset the friction-surfaces. This spring-restraining mechanism is shown in two forms in the accompanying drawings, of which the form shown in Figs. 1, 2, and 3 may be described as follows: 13 and 14 are a pair of annular disks surrounding the shaft and connected together by the bolts 15 and 16, screw-threaded to one or both of them. The shanks of these bolts project into the frame 2, by which they are held in position with freedom of rotation and longitudinal reciprocation. The heads of these bolts carry the arms 17 and 18, connected by the link 19, and one of these arms carries the handle 20, by which the operator may give the bolts 15 and 16 a partial rotation in either direction, forcing together or separating the disks 13 and 14. The disks 13 and 14 restrain the spring 12 through the following mechanism: The spring 12 abuts at opposite ends against the disk 21 and the crown of the cap 22, which carries the flange 23. The disk 21 and flange 23 are pinched together by the disks 13 and 14, acting through the antifriction-washers 24 and 25. The disk 21 bears against the washer 26, which bears against the cross-key 27, which bears against the central pin 28, which bears against the cross-key 29, which bears against the disk 30, which bears against the end of the drum 7. 31 is a hand-wheel screw-threaded on the end of the shaft 5, and 32 is another hand-wheel screw-threaded thereon to act as a jam-nut. The wheel 31 bears against the crown of the cap 22 in opposition to the spring 12, and therefore acts as an adjustable abutment on the shaft for the spring. It is now evident that when the adjustment of the disks 13 and 14 is not such as to restrain the spring 12 the power of that spring will be exerted through the train of mechanism described to force the drum 5 toward the spur-wheel 6, compress the counter-spring 11, and set the friction-surfaces; but this train of mechanism may be partially or wholly relieved from the power of the spring 12 by the movement of the disks 13 and 14 so as to pinch the spring 12, and thus permit the counter-spring 11 to unset the friction-surfaces by forcing the drum 7 away from the spur-wheel 6. Since the pinching of the spring 12 is accomplished between the disk 21 and cap 22, its pressure is partially or wholly removed not merely from the train of mechanism before referred to, but also from the hand-wheel 31, so as to reduce or eliminate the pressure due to the backward thrust as well as the forward thrust of the spring 12 between those parts which rotate with the shaft and those which are stationary with the disks 13 and 14, thus substantially eliminating the friction, which has been the source of so much difficulty in past constructions. When the spring 12 is unrestrained, it and the disk 21 and cap 22 will rotate with the shaft; but when it is restrained it and the disk 21 and cap 22 may remain stationary.

In the construction shown in Figs. 4 and 5 the annular disks 13ª and 14ª, which correspond in function and mode of operation with the disks 13 and 14, are supported by the pivoted arms 33 and 34. They are urged apart by the interposed spiral spring 35; but the operator may draw them together by turning the screw-threaded bolt 36 through the hand-chain 37. In the construction shown in Figs. 4 and 5 the spring 12ª abuts at opposite ends against the crowns of the caps 38 and 39, carrying, respectively, the flanges 40 and 41. The disk 14ª is secured by pivots 42, diametrically opposite each other, to the annular disk 43, so that the flanges 40 and 41 are pinched together between the disk 13ª and the disk 43. Sufficient space is left between the peripheries of the caps 38 and 39 and the disks 13ª and 14ª to permit freedom of movement without contact, and the flange 44 may be provided to limit the movement of the disk 13ª in that direction. 45 and 46 are jam-nuts threaded or otherwise adjustably fixed to the shaft 5ª, and therefore acting as an adjustable rear abutment for the spring 12ª. In the construction shown in Figs. 4 and 5, when the spring 12ª is pinched by the restraining mechanism the pressure of both its forward and backward thrust is relieved at the points of contact between the rotating and non-rotating parts. When the spring 12ª is unrestrained, it and the caps 38 and 39 will rotate with the shaft; but when the spring is restrained it and said caps may remain stationary with the disks 13ª and 14ª. The power of the spring 12ª when unrestrained is transmitted through the hub of the clutch member 7ª to compress the counter-spring 11ª and set the friction-surfaces.

It will be observed that in both forms of construction above described the power of the master-spring 12 or 12ª, tending to set the clutch by its superiority to that of the counter or subordinate spring 11 or 11ª, is restrained by a mechanism both members of which (e. g., the members 13 and 14 or 13ª and 14ª) are pinched together independently of the rotating parts, and therefore when the master-spring is restrained the rotating parts are partially or wholly relieved of its pressure.

The abutments which receive the back thrusts of the two springs are fixed to the shaft, so that the strain of this thrust is borne by the shaft itself and not by the bearings of the shaft. Thus in the construction shown in Fig. 1 the shoulder 47 is one of these abutments and the hand-wheel 31 is the other, while in Fig. 4 the nut 45 is one of these abutments and the disk 48, fixed to the shaft, is the other. The adjustability of the distance between these two abutments regulates the maximum extent to which the clutch may be set by the operation of the master-spring-restraining mechanism.

I do not wish to limit myself to the exact construction shown, because various modifications will suggest themselves without departing from the principle of my invention, one feature of which principle consists, for example, in the capacity for eliminating the losses due to end thrust of the set spring while the clutch is unset.

Having thus described my invention, I claim as new and desire to secure by Letters Patent—

1. In combination with the driving and driven members of a clutch, a master-spring tending to set the clutch, a subordinate spring tending to unset the same and pinching mechanism whereby the master-spring is restrained independently of the rotating parts.

2. In combination with the driving and driven members of a clutch, a master-spring tending to set the clutch, a subordinate spring tending to unset the same, means of adjustment for the abutment of one of said springs and a pinching mechanism whereby the master-spring is restrained independently of the rotating parts.

3. In combination, a shaft, the driving and driven members of a clutch mounted on said shaft, two springs tending, respectively, to set and unset said clutch and pinching mechanism whereby one of said springs is restrained independently of the rotating parts.

4. In combination, a shaft, the driving and driven members of a clutch mounted thereon, a master-spring tending to set the clutch, a subordinate spring tending to unset the same, abutments secured to the shaft for the backward thrust of each of said springs, means whereby the distance between said abutments may be adjusted and a pinching mechanism whereby the master-spring is restrained independently of the rotating parts.

5. In combination with the driving and driven members of a clutch, a master-spring tending to set the clutch, a subordinate spring tending to unset the same and pinching mechanism containing two members mounted independently of the rotating parts whereby the master-spring is restrained.

6. In combination with the driving and driven members of a clutch, a spring of relatively less power than the clutch-setting spring, adapted to unset the clutch, a spring tending to set the clutch and pinching mechanism mounted independently of the rotating parts whereby the clutch-setting spring is restrained.

7. In combination with the driving and driven members of a clutch, a spring of relatively less power than the clutch-setting spring tending to unset the clutch, a spring tending to set the clutch and pinching mechanism containing two inversely-operating members both of which are movable in such manner as to relieve the pressure of the clutch-setting spring at both ends.

8. In combination with the driving and driven members of a clutch, a master-spring tending to set the clutch, a subordinate spring tending to unset the same and pinching mechanism containing two inversely-operating members both of which are movable in such manner as to relieve the pressure at both ends of the master-spring.

9. In combination, a shaft, the driving and driven members of a clutch mounted thereon, an abutment, a master-spring interposed between said abutment and one of said clutch members, a subordinate spring interposed between said clutch mechanism and a pinching mechanism whereby the pressure of said master-spring is relieved both from said abutment and said clutch member.

10. In combination, a shaft, the driving and driven members of a clutch mounted thereon, an abutment, a spring coiled around the shaft between said abutment and one of said clutch members and a pinching mechanism operating to reduce the pressure of the spring at both ends.

11. In combination, a shaft, its bearings, a friction-drum mounted upon said shaft between said bearings, a friction-setting thrust member extending from said drum through one of said bearings, a spring located beyond said bearing for actuating said thrust member and a pinching mechanism whereby said thrust member may be relieved from the pressure of said spring.

12. In combination, a shaft, its bearings, a friction-drum mounted upon said shaft between said bearings, a friction-setting thrust member extending from said drum through one of said bearings, a spring located beyond said bearing for actuating said thrust member and a pinching mechanism whereby said thrust member may be relieved from the pressure of said spring and a hand-operated nut adjustably connected with the end of said shaft against which said spring bears when actuating said thrust member.

13. In combination, a shaft 5, the frames 1 and 2 in which it has its bearings, the friction-drum 7 upon said shaft between said frames, the thrust member 28 whereby the friction is set and which extends through said frame 2, a pinching mechanism mounted outside of said frame 2 and carrying a spring 12 in position when relieved from said pinching mechanism to actuate said thrust member.

14. In combination, a shaft 5, a frame 2 containing a bearing for the same, a thrust-pin 28 carried by said shaft and extending through said bearing, a cross-pin 27 extending through the shaft outside of said bearing, an abutment 31 adjustably secured on said shaft and a thrust actuating mechanism interposed between said abutment and said cross-pin.

15. In combination, a shaft, a frame containing a bearing for the same, a rope-drum mounted upon said shaft on one side of said bearing, an abutment on said shaft on the opposite side of said bearing and the following thrust mechanism interposed between said abutment and said rope-drum, viz: two cross-pins extending through the shaft on opposite sides of said bearing, a thrust-pin interposed between said cross-pins and a thrust mechanism interposed between said abutment and said cross-pin on the outside of said bearing.

16. In combination with the driving and driven members of a clutch, means tending to unset the clutch, means of relatively greater power than the clutch-unsetting means, adapted to set the clutch, and mechanism for nullifying the effect of the excessive power of the clutch-setting means, to permit the clutch to be unset by the unsetting means.

17. In combination with the driving and driven members of a clutch, a spring tending to unset the clutch, a spring of relatively greater power normally tending to overcome the tension of the clutch-unsetting spring and set the clutch, and mechanism for nullifying the excessive power of the setting-spring.

In testimony whereof I have hereunto signed my name in the presence of two subscribing witnesses.

THOMAS SPENCER MILLER.

Witnesses:
 CHAS. C. PIERCE,
 CHAS. G. MUNIER